G. ATKINS.
Hand Seeder.
No. 15,114.
Patented June 17, 1856
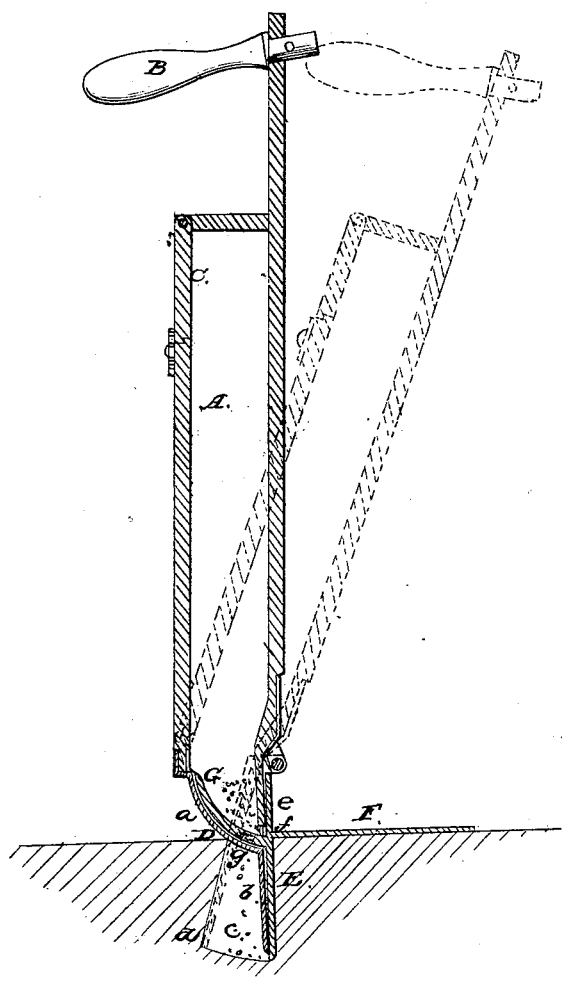
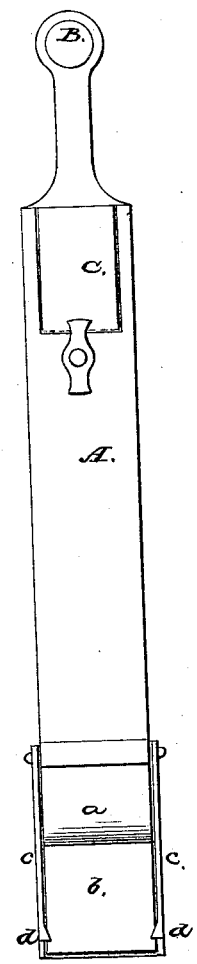

UNITED STATES PATENT OFFICE.

GEO. ATKINS, OF PITTSBURG, PENNSYLVANIA.

IMPROVEMENT IN HAND CORN-PLANTERS.

Specification forming part of Letters Patent No. 15,114, dated June 17, 1856.

*To all whom it may concern:*

Be it known that I, GEORGE ATKINS, of Pittsburg, in the county of Allegheny and State of Pennsylvania, have invented a new and Improved Corn-Planter for Planting Corn by Hand; and I do hereby declare that the following is a full, clear, and exact description of the same, reference being had to the annexed drawings, making a part of this specification, in which—

Figure 1 is a vertical section of my improvement. Fig. 2 is a front view of the same.

Similar letters of reference indicate corresponding parts in the two figures.

My invention consists in the peculiar construction of the implement, as will be hereinafter fully shown and described, whereby corn may be planted with great facility and in an expeditious and perfect manner.

To enable those skilled in the art to fully understand and construct my invention, I will proceed to describe it.

A represents an oblong rectangular box, which may be constructed of wood, and having a handle, B, at its upper end. A door, C, is also placed in the upper end of the box A, through which the corn is poured and the box filled.

The lower end of the box A has a plate, D, attached to it. This plate is of curved and straight form, as shown clearly in Fig. 1, $a$ representing the curved and $b$ the straight portion. The curved portion $a$ forms the bottom of the box A and the straight portion $b$ projects downward from the box A in line with the front side of the box.

To the front side of the box A, and near its front end, there is hinged a plate, E, which has a plate, $c$, secured at each side of it, the plates $c$ being at right angles with the plate E and forming a sort of box in which the straight portion $b$ of the plate D is fitted, the back edges of the plates $c$ having each a lip, $d$, on them to prevent the portion $b$ of the plate D from passing out of the box.

A horizontal plate, F, is attached to the front side of the plate E, and to the back side of said plate a curved plate, G, is attached, said plate passing through a recess, $e$, in the front side of the box A, and having a hole, J, made through it. A brush, $g$, is placed in the recess $e$, said brush bearing upon the plate F. (See Fig. 1.)

The operation is as follows: The box A is filled with corn and the operator presses the plates E $c$ $c$ and the straight portion $b$ of the plate D into the ground till the horizontal plate F strikes the surface, the box A being in line with the plate E. The plate F serves as a gage and insures the planting of the corn at a requisite depth beneath the surface of the soil. When the plate F touches the ground the operator shoves forward the box A, and the straight portion $b$ of the plate D forces back the earth, and the hole $g$ in the plate G is opened or exposed, the curved portion $a$ of the plate D passing from underneath it, and the corn which filled the hole $g$ when the box A was in an upright position will fall into the space or opening made by the part $b$ of the plate D, (see red lines, Fig. 1.) The implement is then raised, the earth falling inward over the corn by its own gravity, as the earth pressed back by the part $b$ of the plate D will be inclined and will readily fall and close the opening in the earth when the implement is withdrawn from it.

The above implement is extremely simple, may be made at a small cost, and will operate well.

Having thus described my invention, what I claim as new, and desire to secure by Letters Patent, is—

Attaching the plate E by a hinge or joint to the lower part of the box A, the plate E having a curved plate, G, attached to its inner side, which plate is provided with a hole, $g$, and works over the curved portion $a$ of the plate D, which is attached to the lower end of the box A, the straight portion $b$ of the plate D being fitted and working between plates $c$ $c$ attached to the plate E, substantially as herein shown and described, so that the distributing device may be operated by merely throwing forward the box A.

GEORGE ATKINS.

Witnesses:
THOMAS STEEL,
WILLIAM CLARK.